Aug. 29, 1950 F. W. FRINK 2,520,138

PANORAMIC RECEIVING SYSTEM

Filed June 7, 1945 2 Sheets-Sheet 1

INVENTOR.
FREDERICK W. FRINK

BY

R. F. Morris
ATTORNEY

Aug. 29, 1950 F. W. FRINK 2,520,138

PANORAMIC RECEIVING SYSTEM

Filed June 7, 1945 2 Sheets-Sheet 2

INVENTOR.
FREDERICK W. FRINK

BY

R P Morris
ATTORNEY

Patented Aug. 29, 1950 2,520,138

UNITED STATES PATENT OFFICE 2,520,138

PANORAMIC RECEIVING SYSTEM

Frederick W. Frink, East Orange, N. J., assignor to Federal Telephone and Radio Corporation, New York, N. Y., a corporation of Delaware Application June 7, 1945, Serial No. 598,008

3 Claims. (Cl. 250—20)

Systems have been proposed for successively and cyclically scanning two or more frequency bands and for producing on a visual indicator, such as an oscilloscope, indications of stations received within any of these frequency bands scanned.

For such systems it is essential that some control arrangement synchronized with the scanning be provided for switching in the different frequency bands to be scanned and for providing sweep signals on the indicator circuit to correspond with the bands being scanned. Likewise, means is required to select any one of the received signals so that its frequency may be precisely indicated.

It is an object of this invention to provide a switching system operated synchronously with the tuning of a panoramic receiver for operating the various switching functions thereof.

It is a further object of my invention to provide means for continuously tuning a receiver over a plurality of frequency bands and means synchronously operative therewith for switching among the bands and for providing sweep indications for visual display of signals received in these bands.

It is a still further object of my invention to provide an arrangement wherein a common oscillator circuit is tuned cyclically over a given frequency range to cover a plurality of band frequencies and in which keying means is provided operated synchronously with the tuning of said oscillator for effecting the switching to the different wave bands.

It is a still further object of my invention to provide a motor drive for tuning an oscillator over a predetermined frequency band and to provide a light shutter together with lamps and photocells for producing control energy for enabling radio frequency amplifier mixers to receive different frequency bands, providing for different displays of the frequency bands and for providing an indicator for use on the various sweep circuit displays.

According to a feature of my invention, I may provide a receiver in the form of separate radio frequency amplifier mixer circuits to cover an upper and lower frequency band and having a common oscillator cooperating therewith. The oscillator frequencies are such that in mixing with frequencies of the received upper band the resultant frequencies are reduced to the same frequency range as would be normally received in the lower band. In the lower band circuit the local oscillations mix with the lower band received signals or the received upper band signals to provide a common output intermediate frequency. A drive means such as a motor is used continuously to tune the oscillator over its frequency band. Synchronously with the drive of the tuning oscillator and preferably at half the speed thereof, is driven a control means, such as a disc providing a light shutter, which serves to produce keying signals for alternately keying into operation said upper and lower band amplifier mixer circuits. The same control means may produce a sweep voltage once for each tuned cycle of the oscillator and provide an arrangement for applying the keying signals to the indicator so that the two sweeps are displaced in time thereon. The same control means driven by the motor also produces a variably positioned reference pulse which may be applied to the sweep circuit amplifier for the purpose of producing an adjustable gap in the tuning lines or may be applied to the vertical deflecting plate of the system to provide a step or offset in the wave band indication.

A better understanding of my invention and the objects and features thereof may be had from the particular description of an embodiment thereof made with reference to the accompanying drawings, in which.

Figure 1:
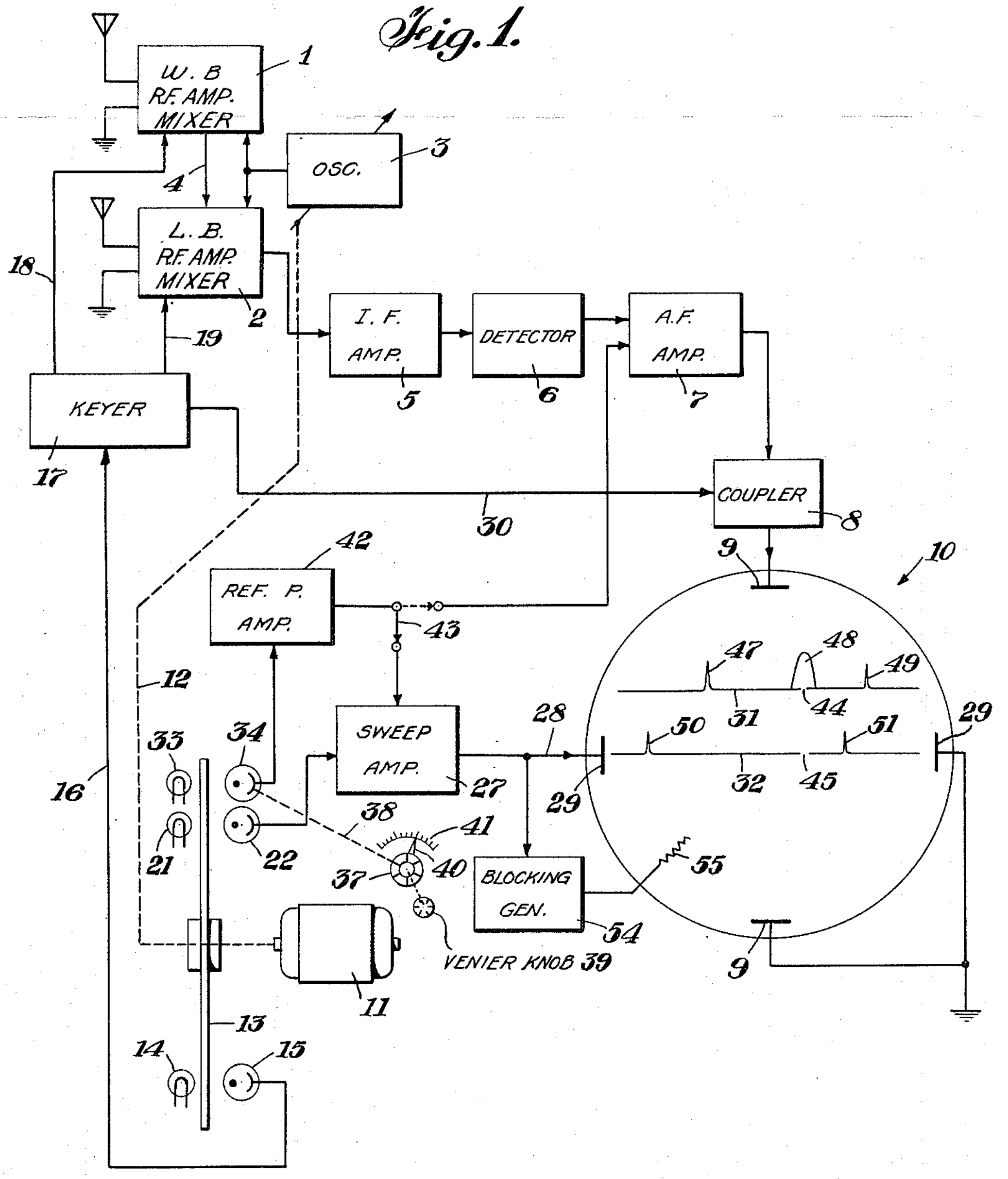
Fig. 1 is a block schematic diagram of a circuit incorporating the features of my invention.
Figures 2, 4:
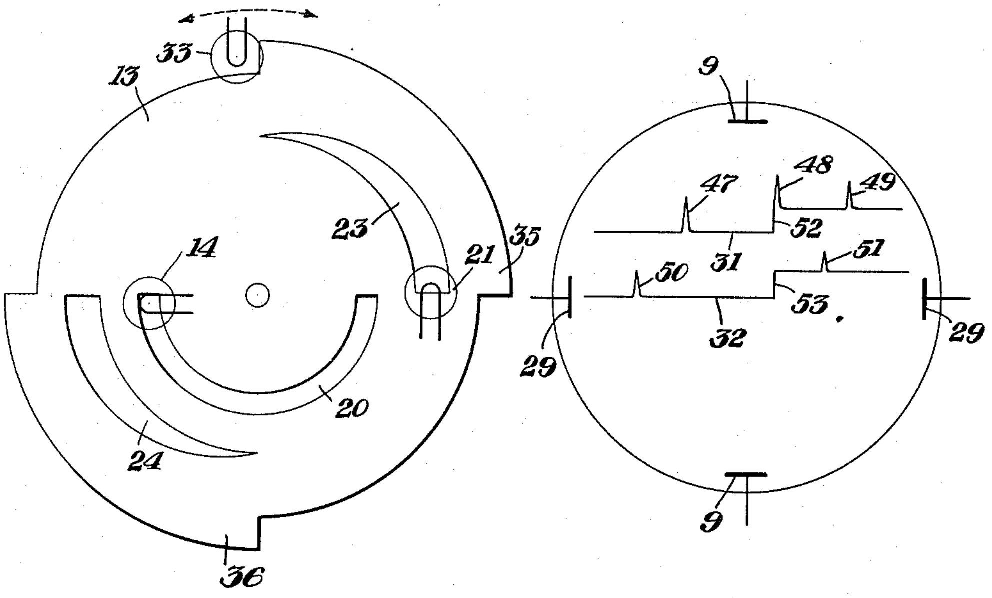
Fig. 2 is a view of the control disc which may be used for generating the various control signals.
Fig. 4 is an illustration of the indicator in an alternative switched position of the reference pulse indicator circuit.

Turning first to Fig. 1, there are provided two radio frequency amplifier mixer circuits 1 and 2 for receiving signal energy in an upper and lower band respectively. A tunable oscillator 3 is associated with amplifier mixers 1 and 2 so that during the sweep in the upper band, energy from oscillator 3 serves to reduce the output energy in line 4 to the same wave band as would be received normally in amplifier mixer 2. This energy is then again beat with the energy from oscillator 3 in the mixer stage of 2 to reduce the energy to a common intermediate frequency. For the lower band reception, energy from oscillator 3 beats directly with the received signals in 2 reducing them to the same intermediate frequency so that the outputs from either amplifier mixer 1 or 2 may be amplified in a common intermediate frequency amplifier 5. The intermediate frequency from amplifier 5 may be then detected in a detector 6 and applied over audio frequency amplifier 7 and coupler 8 to the vertical deflecting plates 9 of a cathode ray oscillograph 10. A motor 11 through the medium of shaft 12 serves to tune oscillator 3 through the desired frequency band to produce the selective output. Carried on shaft 12 of motor 11 is a control disc 13 which is driven at the speed of the tuning control of oscillator 3 which may comprise a variable condenser rotor. This variable condenser may be of the type in which a balanced symmetrical rotor cooperates with two stators to cause the frequency to vary from minimum to maximum twice during each revolution. A lamp 14 and photocell 15 associated with disc 13 serve to produce rectangular pulses which are applied over line 16 to keyer 17 and from there to amplifier mixers 1 and 2 over lines 18 and 19 to control their blocking. As seen in Fig. 2 disc 13 may carry a slot 20 which is in the form of a semicircle so that an output wave in the form shown in Fig. 3, curve *a*, will be produced. This wave will serve alternately to block 1 and 2 as above described. It will thus be seen that each time oscillator 3 sweeps through its frequency range either the output of the upper band amplifier mixer 1 or lower band amplifier mixer 2 will be applied through the circuit arrangement to the vertical deflecting plates 9 of indicator 10.

An arrangement consisting of a lamp 21 and photocell 22 cooperates with slots 23 and 24 in disc 13 to produce sweep waves in accordance with peaks 25 and 26 of curve *b*. These output waves may be amplified in sweep amplifier 27 and applied over a conducting lead 28 to the horizontal deflecting plates 29 of indicator 10. These sweep voltage waves will thus sweep the beam across the face of indicator 10 in time corresponding to the frequency changes in oscillator 3. Simultaneously with the switching of the radio frequency amplifier mixers into upper and lower band blocking relationships, keyer 17 applies voltages over line 30 and coupler 8 to vertical deflecting plates 9 so as to displace the sweep lines 31 and 32 vertically on the face of indicator 10 corresponding with the upper and lower side band indications respectively.

Another arrangement comprising a lamp 33 and a photocell 34 is associated with disc 13. The slots provided in the periphery of the disc and lamp 33 cooperate with the two alternately shuttering portions 35 and 36 serving to generate a rectangular wave of the general form indicated in line *c* of Fig. 3. This additional wave may be considered as a reference pulse voltage. Lamp 33 and photocell 34 are mounted for relative rotary positioning with respect to disc 13 under control of a tuning knob 37 and drive shaft 38 which may be also further adjusted for finer control by a vernier tuning knob 39. Knob 37 has a pointer 40 and a scale 41 associated therewith so that the tuning position corresponding to the adjustment of knob 37 will be indicated on the scale and pointer. The reference pulse generated in photocell 34 may be applied to reference pulse amplifier 42 and over a switch 43 alternatively to sweep amplifier 27 or to audio frequency amplifier 7. In the position shown, switch 43 is associated with sweep amplifier 27 so that the output reference pulse will be combined with the sweep voltage to provide a combined sweep curve as shown in *d*, Fig. 3. Because of the steep side of the pulses of curve *c* they will, when added to the sweep voltage, cause an abrupt acceleration of the beam along lines 31 and 32 producing effectively gaps in the sweep lines as indicated at 44 and 45. By adjusting tuning knob 37 and the associated lamp 33 and tube 34, the position of the reference pulse may be varied as indicated by the dotted line portions shown at 46 (Fig. 3) in curves *c* and *d*. Thus the gap may be adjusted longitudinally of the sweep lines 31 and 32 to correspond with a predetermined received signal.

The received signals may comprise, for instance, pulses 47, 48 and 49 in the upper band and 50 and 51 in the lower band as illustrated. By aligning the gap or indicator with the desired pulse such as 48 for example, the pulse will be substantially broadened so that it may be quite readily determined that the adjustment is such as to align it with this pulse. Therefore, the frequency of the pulse may be quite accurately determined by means of pointer 40 and scale 41.

When switch 43 is turned into its alternative switching position, the reference pulses such as shown at *c* are combined in audio frequency amplifier 7 so that they will produce a further vertical deflection or step in the sweep lines as can be more readily seen in Fig. 4. This produces a bend or knee in the curves or sweep lines 31 and 32 as shown at 52 and 53 which may be adjusted along the sweep lines in the same manner as the gaps 44 and 45 are adjusted. This form of indication is preferable when considerable noise is present since it is diffcult to see the gap in the trace line when the trace line is deflected by considerable noise energy. Accordingly, adjustment for tuning position may be first made roughly with the switch in the position to apply the reference pulses to the vertical deflecting plates and when a station such as 48 has been substantially selected by this method, the switch may be turned to its alternative position to produce the acceleration of the beam at this point and the consequent widening of the pulse for the more precise tuning of the system.

Figure 3:
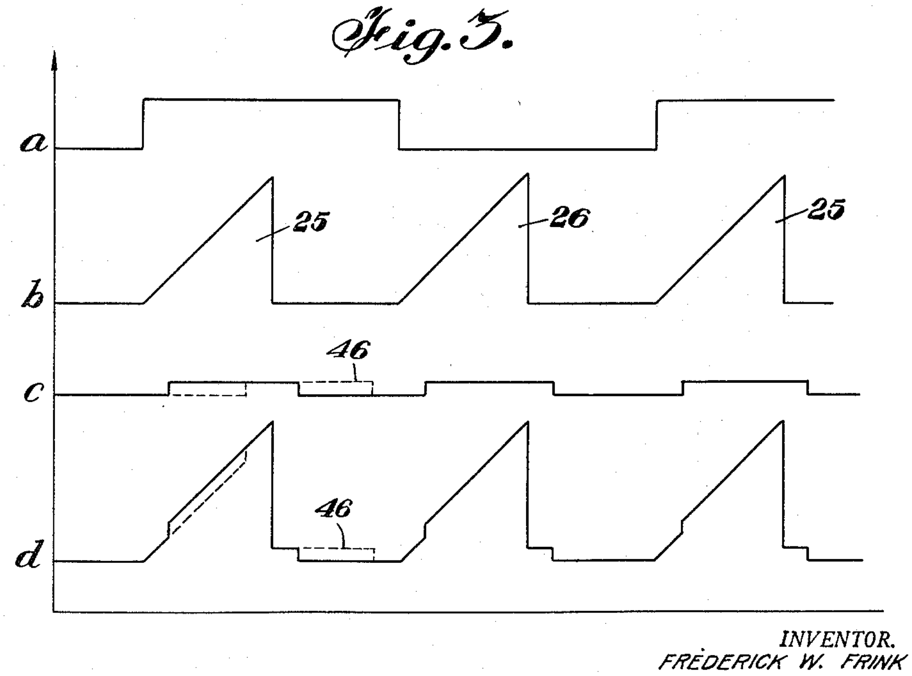
Fig. 3 is a graphical illustration of the voltages produced for the various switching controls in the receiver of Fig. 1.

As will be noted from the curves shown in Fig. 3, the sweep voltage potentials 25 and 26 are effective for only substantially half the time. Accordingly, it is desirable that the cathode ray oscillograph beam be effective only during these sweep periods. This may be accomplished in accordance with my invention by providing a blocking generator 54 which may be coupled for example to the output of sweep amplifier 27 and applying the output blocking wave from this generator to a control grid 55 on indicator 10. Thus, control grid 55 is maintained blocked during the interval between the sweep pulse applications 25 and 26.

As described above, a specific circuit arrangement has been shown in connection with the system of the present invention. It should be clear, however, that many modifications of the system may be made consistent with my invention by those skilled in the art. The specific form of indicator used and the particular type of switching and keying arrangements may readily be changed as desired. Furthermore, the principles of my invention may be generally applied to any circuit wherein this type of indication is desired and need not be limited to the type of apparatus illustrated. It should therefore be distinctly understood that the specific embodiment described above is made merely by way of illustration and is not to be considered as any limitation of my invention as set forth in the objects thereof and in the appended claims.

I claim:

1. A receiver system comprising two fixed circuits and a tunable local oscillator, said two circuits operative over separate frequency bands, means for coupling said local oscillator to said circuits to produce in a common output a given intermediate frequency for both said bands, driving means for tuning said local oscillator over its given frequency range in a given cycle, switching means controlled by said driving means for producing a blocking wave having a period timed with the periods of the local oscillator tuning for alternately controlling said circuits whereby said receiver alternately responds to signals in said frequency bands, means cooperating with said switching means for producing sweep voltages synchronized with said tuning periods, means adjustably cooperating with said switching means for producing indicator voltages corresponding in duration with said sweep voltages, an oscilloscope indicator having vertical and horizontal beam deflecting means, means for coupling sweep voltage producing means to said horizontal deflecting means to produce horizontal sweeps of said beam, means for coupling the blocking voltage source to said vertical plates to provide vertical displacement of alternate sweeps, means for coupling the intermediate frequency to said vertical plates to provide indications of signals received in either of said bands, and means for coupling the indicator voltage source alternatively to said vertical or said horizontal plates to produce a vertical displacement break or an effective acceleration gap in said sweeps corresponding to the adjustment of said indicator voltage producing means.

2. A receiver system comprising two fixed circuits and a tunable local oscillator, said two circuits operative over separate frequency bands, means for coupling said local oscillator to said circuits and said circuits together to produce in a common output a given intermediate frequency over both said bands, a motor for tuning said local oscillator over its given frequency range in a given cycle, shutter means driven by said motor, first photo-electric means cooperating with said shutter means for producing a blocking wave having a period timed with the periods of the local oscillator tuning for alternately blocking said circuits whereby said circuits alternately respond to signals in their respective frequency bands, second photo-electric means cooperating with said shutter means for producing sweep voltages synchronized with said tuning periods, a third photo-electric means adjustably cooperating with said shutter means for producing indicator voltages corresponding in duration with said sweep voltages, and oscilloscope indicator having vertical and horizontal beam deflecting means, means for coupling sweep voltage producing means to said horizontal deflecting means to produce horizontal sweeps of said beam, means for coupling the blocking voltage source to said vertical plates to provide vertical displacement of alternate sweeps, means for coupling the intermediate frequency output to said vertical plates to provide indications of signals received in either of said bands, and means for coupling the indicator voltage source to said vertical plates to produce a vertical displacement break in said sweeps corresponding to the adjustment of said third photo-electric means.

3. A receiver system comprising two fixed amplifier mixer circuits and a tunable local oscillator, said two circuits operative over separate frequency bands, means for coupling said local oscillator to said circuits and said two circuits together to produce in a common output a given intermediate frequency over both said bands, a motor for tuning said local oscillator over its given frequency range in a given cycle, shutter means driven by said motor, first photo-electric means cooperating with said shutter means for producing a blocking wave having a period timed with the periods of the local oscillator tuning for alternately blocking said circuits whereby said circuits alternately respond to signals in their respective frequency bands, second photo-electric means cooperating with said shutter means for producing sweep voltages synchronized with said tuning periods, a third photo-electric means adjustably cooperating with said shutter means for producing indicator voltages corresponding in duration with said sweep voltages, an oscilloscope indicator having vertical and horizontal beam deflecting means, means for coupling sweep voltage producing means to said horizontal deflecting means to produce horizontal sweeps of said beam, means for coupling the blocking voltage source to said vertical plates to provide vertical displacement of alternate sweeps, means for coupling the intermediate frequency output to said vertical plates to provide indications of signals received in either of said bands, and means for coupling the indicator voltage source to said horizontal plates to produce an effective acceleration gap in said sweeps corresponding to the adjustment of said third photo-electric means.

FREDERICK W. FRINK.

REFERENCES CITED

The following references are of record in the file of this patent:

UNITED STATES PATENTS

| Number | Name | Date |
|---|---|---|
| 2,031,639 | Finch | Feb. 25, 1936 |
| 2,279,151 | Wallace | Apr. 7, 1942 |
| 2,300,189 | Wolf | Oct. 7, 1943 |
| 2,347,977 | Lieshout | May 2, 1944 |
| 2,367,907 | Wallace | Jan. 23, 1945 |
| 2,378,604 | Wallace | June 19, 1945 |
| 2,416,346 | Potter | Feb. 25, 1947 |
| 2,465,500 | Wallace | Mar. 29, 1949 |